(12) United States Patent
Tsujita et al.

(10) Patent No.: US 8,606,056 B2
(45) Date of Patent: Dec. 10, 2013

(54) OPTO-ELECTRIC HYBRID BOARD AND MANUFACTURING METHOD THEREFOR

(75) Inventors: Yuichi Tsujita, Ibaraki (JP); Masayuki Hodono, Ibaraki (JP); Akiko Nagafuji, Ibaraki (JP); Masami Inoue, Ibaraki (JP); Mayu Takase, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 125 days.

(21) Appl. No.: 13/413,808

(22) Filed: Mar. 7, 2012

(65) Prior Publication Data

US 2012/0251037 A1 Oct. 4, 2012

Related U.S. Application Data

(60) Provisional application No. 61/473,497, filed on Apr. 8, 2011.

(30) Foreign Application Priority Data

Mar. 29, 2011 (JP) ................................. 2011-073617

(51) Int. Cl.
| G02B 6/12 | (2006.01) |
| G02B 6/36 | (2006.01) |
| G02B 6/10 | (2006.01) |

(52) U.S. Cl.
USPC ............... 385/14; 385/88; 385/129; 385/130; 385/131

(58) Field of Classification Search
USPC ..................................... 385/14, 88
See application file for complete search history.

(56) References Cited

U.S. PATENT DOCUMENTS

| 6,229,942 | B1 * | 5/2001 | Engberg et al. | 385/39 |
| 6,741,778 | B1 * | 5/2004 | Chan et al. | 385/52 |
| 6,801,693 | B1 * | 10/2004 | Jacobowitz et al. | 385/50 |
| 6,934,450 | B2 * | 8/2005 | Hiramatsu | 385/52 |
| 7,212,713 | B2 * | 5/2007 | Fukuzawa et al. | 385/50 |
| 7,364,366 | B2 * | 4/2008 | Tourne | 385/69 |
| 7,382,954 | B1 * | 6/2008 | Dangel et al. | 385/52 |
| 8,272,788 | B2 * | 9/2012 | Ohta | 385/58 |

FOREIGN PATENT DOCUMENTS

| JP | 05-196831 A | 8/1993 |
| JP | 2009-223063 A | 10/2009 |

* cited by examiner

*Primary Examiner* — Ryan Lepisto
(74) *Attorney, Agent, or Firm* — Westerman, Hattori, Daniels & Adrian, LLP

(57) ABSTRACT

Provided are an opto-electric hybrid board and a manufacturing method therefor. The opto-electric hybrid board includes an optical waveguide unit and an electric circuit unit having an optical element mounted thereon, the electric circuit unit being coupled to the optical waveguide unit. The optical waveguide unit includes notch portions for locating the electric circuit unit, which is formed in portions of at least one of an undercladding layer and an overcladding layer, and the notch portions are located and formed at predetermined locations with respect to one end surface of a core. The electric circuit unit includes bent portions, which fit into the notch portions, and the bent portions are located and formed at predetermined locations with respect to the optical element. The optical waveguide unit and the electric circuit unit are coupled to each other under a state in which the bent portions fit into the notch portions.

4 Claims, 14 Drawing Sheets

OPTO-ELECTRIC HYBRID BOARD AND MANUFACTURING METHOD THEREFOR

RELATED APPLICATIONS

This application claims the benefit of U.S. Provisional Application No. 61/473,497 filed on Apr. 8, 2011, which is hereby incorporated by reference.

BACKGROUND OF THE INVENTION

1. Field of the Invention

The present invention relates to an opto-electric hybrid board which includes an optical waveguide unit and an electric circuit unit having an optical element mounted thereon, and to a manufacturing method therefor.

2. Description of the Related Art

In recent electronic devices or the like, as the amount of transmission information increases, in addition to electric wiring, optical wiring is adopted. More specifically, an opto-electric hybrid board including an electric circuit unit in which an optical element such as a light-emitting element for converting an electrical signal into an optical signal or a light-receiving element for converting an optical signal into an electrical signal is mounted on an electric circuit board having electric wiring formed thereon, and an optical waveguide unit in which an optical waveguide as optical wiring for transmitting the optical signal is formed is incorporated in the electronic device or the like.

In the opto-electric hybrid board, light which is emitted from the light-emitting element is required to enter one end surface (light entrance) of a core (optical wiring) of the optical waveguide unit, and light which exits the other end surface (light exit) of the core is required to be received by the light-receiving element. Therefore, it is necessary that the optical element (the light-emitting element or the light-receiving element) and the core be aligned with each other.

Accordingly, methods of aligning the optical element and the core are conventionally proposed. In an exemplary method, an optical waveguide unit is fixed and, in a state in which light is emitted from a light-emitting element to one end surface (light entrance) of a core of the optical waveguide unit while the location of the light-emitting element is changed, the intensity of light which exits from the other end surface (light exit) of the core is monitored, and the location at which the intensity becomes the highest is determined as the alignment location (see JP-A1-HEI5 (1993)-196831). In another exemplary method, a connector having holes for locating formed therein is attached to an optical waveguide unit, pins for locating, which fit into the holes, are attached to an electric circuit unit, and, by fitting the pins into the holes, respectively, an optical element and a core of the optical waveguide unit are automatically aligned (see JP-A1-2009-223063).

However, in the aligning method described in JP-A1-HEI5 (1993)-196831 above, although alignment with high accuracy is possible, it takes time and effort, and thus, the method lacks mass-productivity. Further, in the aligning method described in JP-A1-2009-223063 above, although position adjustment may be carried out in a simple method of fitting the pins into the holes, respectively, not only dimensional deviations are caused when the connector and the pins are respectively manufactured but also misalignment of the attachment location of the connector with respect to the optical waveguide unit, misalignment of the attachment location of the pins for locating with respect to the electric circuit unit, and the like are caused. Accumulation of those dimensional deviations and misalignments lowers the accuracy of the alignment. If enhancement of the accuracy of the alignment is attempted, control of the dimensional accuracy is necessary so that the dimensional deviations and misalignments are not caused, and thus the cost increases and the method lacks mass-productivity.

SUMMARY OF THE INVENTION

An opto-electric hybrid board is provided which eliminates the necessity of an aligning operation of a core of an optical waveguide unit and an optical element of an electric circuit unit and which is excellent in mass-productivity. A manufacturing method therefor is also provided.

An opto-electric hybrid board is provided including: an optical waveguide unit; and an electric circuit unit having an optical element mounted thereon, the electric circuit unit being coupled to the optical waveguide unit, in which the optical waveguide unit includes: an undercladding layer; a core for an optical path, which is formed on a surface of the undercladding layer; an overcladding layer which covers the core; and a notch portion or a through hole for locating the electric circuit unit, which is formed in a portion of at least one of the undercladding layer and the overcladding layer; the electric circuit unit includes: an electric circuit board; the optical element mounted at a predetermined portion on the electric circuit board; and a bent portion formed by bending a part of the electric circuit board so as to stand for fitting into the notch portion or the through hole; the notch portion or the through hole in the optical waveguide unit is located and formed at a predetermined location with respect to one end surface of the core; the bent portion of the electric circuit unit is located and formed at a predetermined location with respect to the optical element; and the optical waveguide unit and the electric circuit unit are coupled to each other under a state in which the bent portion of the electric circuit unit fits into the notch portion or the through hole in the optical waveguide unit.

Further, there is provided a manufacturing method for the opto-electric hybrid board in which an optical waveguide unit and an electric circuit unit having an optical element mounted thereon are coupled, the method including: manufacturing the optical waveguide unit including: forming an undercladding layer; forming, on a surface of the undercladding layer, a core for an optical path; and forming an overcladding layer so as to cover the core, at least one of the forming of the undercladding layer and the forming of the overcladding layer including forming a notch portion or a through hole for locating the electric circuit unit at a predetermined location located with respect to one end surface of the core; manufacturing the electric circuit unit including: forming an electric circuit board; mounting the optical element at a predetermined portion on the electric circuit board; and forming, after the mounting the optical element, a bent portion for fitting into the notch portion or the through hole by bending so as to stand upright at a predetermined location located with respect to the optical element; and coupling the optical waveguide unit and the electric circuit unit to manufacture the opto-electric hybrid board, the coupling including fitting the bent portion of the electric circuit unit into the notch portion or the through hole in the optical waveguide unit.

In the opto-electric hybrid board, the optical waveguide unit and the electric circuit unit having the optical element mounted thereon are coupled. In the optical waveguide unit, the one end surface of the core and the notch portion or the through hole for locating the electric circuit unit are in a positional relationship of being located with respect to each other. Further, in the electric circuit unit, the optical element and the bent portion which fits into the notch portion or the through hole in the optical waveguide unit are in a positional relationship of being located with respect to each other. Therefore, in a state in which the bent portion of the electric circuit unit fits into the notch portion or the through hole in the optical waveguide unit, that is, in a state in which the optical waveguide unit and the electric circuit unit are coupled to each other, the core of the optical waveguide unit and the optical element of the electric circuit unit are automatically aligned. In addition, the notch portion or the through hole in the optical waveguide unit is formed in a predetermined portion of the at least one of the undercladding layer and the overcladding layer which form the optical waveguide unit, while the bent portion of the electric circuit unit is formed in the electric circuit board which forms the electric circuit unit. Therefore, an additional component such as a connector is not provided for fitting the bent portion into the notch portion or the through hole. Therefore, in the coupling between the optical waveguide unit and the electric circuit unit, there is no accumulation of dimensional deviations and misalignments due to such additional components including a connector, and the core of the optical waveguide unit and the optical element of the electric circuit unit are aligned with high accuracy. As described above, in the opto-electric hybrid board, the core and the optical element are formed to be automatically aligned with high accuracy by a simple operation of fitting the bent portion of the electric circuit unit into the notch portion or the through hole in the optical waveguide unit, and thus an aligning operation which takes time and effort is not necessary and the opto-electric hybrid board is excellent in mass-productivity. Further, an additional component such as a connector is not necessary for fitting the bent portion into the notch portion or the through hole, and thus control of the dimensional accuracy of the connector or the like is not necessary. Also in this regard, the opto-electric hybrid board is excellent in mass-productivity.

In particular, in a case where the notch portion in the optical waveguide unit is formed so as to be V-shaped or Y-shaped, a width of which gradually decreases toward a valley of the notch, a notch portion which is V-shaped or Y-shaped, a width of which gradually decreases toward a valley of the notch, is formed in the bent portion of the electric circuit unit, and the notch portion in the optical waveguide unit which is V-shaped or Y-shaped and the notch portion which is V-shaped or Y-shaped in the bent portion of the electric circuit unit fit into each other, the fitting is fitting between the V-shaped or Y-shaped notch portions, and thus, the fitting is less liable to be lost. Therefore, misalignment of the optical waveguide unit with respect to the electric circuit unit is prevented with greater reliability, and thus, the alignment between the core and the optical element may be maintained with greater reliability.

The manufacturing method for an opto-electric hybrid board is carried out by coupling an optical waveguide unit and an electric circuit unit having an optical element mounted thereon. In manufacturing steps for the optical waveguide unit, a notch portion or a through hole for locating the electric circuit unit is formed in a predetermined location which is located with respect to one end surface of a core. Further, in manufacturing steps for the electric circuit unit, a bent portion which fits into the notch portion or the through hole in the optical waveguide unit is formed at a predetermined location which is located with respect to the optical element. Therefore, by fitting the bent portion of the electric circuit unit into the notch portion or the through hole in the optical waveguide unit to couple the optical waveguide unit and the electric circuit unit to each other, the core of the optical waveguide unit and the optical element of the electric circuit unit may be automatically aligned. In addition, the notch portion or the through hole in the optical waveguide unit is formed in a predetermined portion of at least one of an undercladding layer and an overcladding layer which form the optical waveguide unit, while the bent portion of the electric circuit unit is formed in a part of an electric circuit board which forms the electric circuit unit. Therefore, an additional component such as a connector is not necessary for fitting the bent portion into the notch portion or the through hole. Therefore, in the coupling between the optical waveguide unit and the electric circuit unit, there is no accumulation of dimensional deviations and misalignments due to such an additional component including a connector, and the core of the optical waveguide unit and the optical element of the electric circuit unit are aligned with high accuracy. As described above, in the manufacturing method for an opto-electric hybrid board, the core and the optical element are automatically aligned with high accuracy by a simple operation of fitting the bent portion of the electric circuit unit into the notch portion or the through hole in the optical waveguide unit, and thus an aligning operation which takes time and effort is not necessary and the method is excellent in mass-productivity. Further, an additional component such as a connector is not necessary for fitting the bent portion into the notch portion or the through hole, and thus control of the dimensional accuracy of the connector or the like is not necessary. Also in this regard, the method is excellent in mass-productivity.

In particular, in a case where the forming of the notch portion includes forming the notch portion in the optical waveguide unit so as to be V-shaped or Y-shaped, a width of which gradually decreases toward a valley of the notch, the forming of the bent portion includes forming a notch portion which is V-shaped or Y-shaped, a width of which gradually decreases toward a valley of the notch, in the bent portion of the electric circuit unit, and the fitting of the bent portion includes causing the notch portion which is V-shaped or Y-shaped in the optical waveguide unit and the notch portion which is V-shaped or Y-shaped in the bent portion of the electric circuit unit to fit into each other, the fitting is fitting between the V-shaped or Y-shaped notch portions, and thus, the fitting is less liable to be lost. Therefore, misalignment of the optical waveguide unit with respect to the electric circuit unit can be prevented with greater reliability.

BRIEF DESCRIPTION OF THE DRAWINGS

FIG. 14 schematically illustrate the optical waveguide unit in still another form, of which

DETAILED DESCRIPTION OF THE INVENTION

Next, embodiments of the present invention are described in detail with reference to the drawings.

Figure 1:
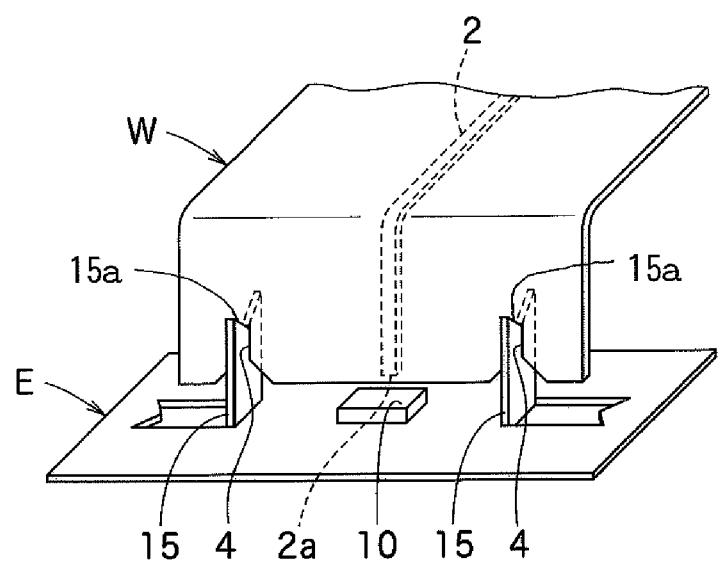
FIG. 1 is a perspective view schematically illustrating a first embodiment of an opto-electric hybrid board.

FIG. 1 is a perspective view schematically illustrating a first embodiment of an opto-electric hybrid board. In the opto-electric hybrid board, an optical waveguide unit W having notch portions 4 for locating an electric circuit unit, and an electric circuit unit E having bent portions 15 into which the notch portions 4 fit, respectively, are separately manufactured, and the optical waveguide unit W and the electric circuit unit E are coupled to be integral by fitting the notch portions 4 of the optical waveguide unit W into the bent portions 15 of the electric circuit unit E, respectively. Here, in the optical waveguide unit W, the notch portions 4 are located and formed at predetermined locations with respect to one end surface (light transmitting surface) 2a of a core 2 (at locations which are set in advance so that, when the units W and E are coupled, the one end surface 2a of the optical waveguide unit W faces an optical element 10 of the electric circuit unit E). Further, in the electric circuit unit E, the bent portions 15 into which the notch portions 4 fit, respectively, are located and formed at predetermined locations with respect to the optical element 10 (at locations which are set in advance so that, when the units W and E are coupled, the optical element 10 of the electric circuit unit E faces the one end surface 2a of the optical waveguide unit W). Therefore, in the opto-electric hybrid board, by fitting the notch portions 4 into the bent portions 15, respectively, the one end surface 2a of the core 2 and the optical element 10 are appropriately located in an aligned state. Note that, in this embodiment, the optical waveguide unit W is coupled to the electric circuit unit E in a bent state.

Figure 2A:
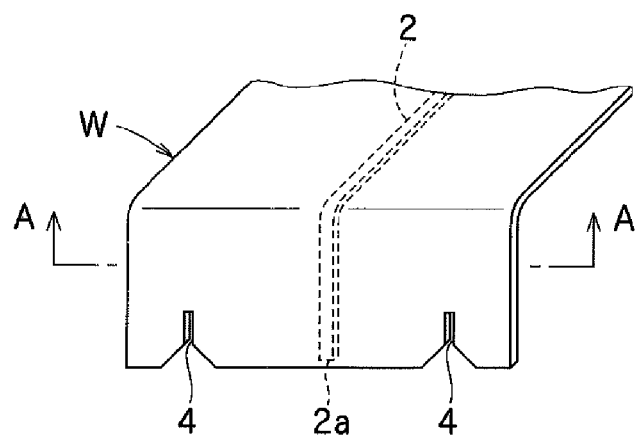
FIG. 2A is a perspective view schematically illustrating an optical waveguide unit which forms the opto-electric hybrid board.
Figure 2B:
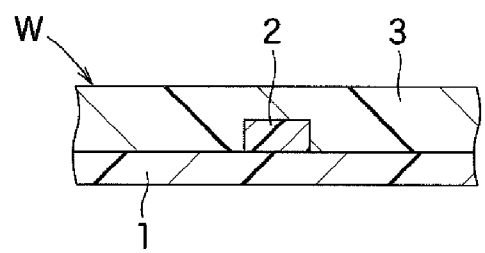
FIG. 2B is an enlarged sectional view of a principal part taken along the line A-A of FIG. 2A.

Description is made in more detail. The optical waveguide unit W includes an undercladding layer 1, the core 2 for an optical path formed on a surface of the undercladding layer 1 in a predetermined linear pattern, and an overcladding layer 3 formed on the surface of the undercladding layer 1 so as to cover the core 2 as illustrated in FIG. 2A as a perspective view and in FIG. 2B as an enlarged sectional view of a principal part taken along the line A-A of FIG. 2A. At one edge of the optical waveguide unit W (lower edge in FIG. 2A), stacked portions of the undercladding layer 1 and the overcladding layer 3 at which the core 2 does not exist are extended along an axial direction of the core 2, and the extended portions are formed into the notch portions 4 for locating the electric circuit unit. The notch portions 4 are located and formed at the predetermined locations with respect to the one end surface 2a of the core 2. In this embodiment, the notch portions 4 are arranged on both sides of the core 2 (in two places), and the notch portions 4 are shaped so as to be Y-shaped (reversed Y-shaped in FIG. 2A) so that the width thereof gradually decreases toward the valley of the notch (upward in FIG. 2A).

Figure 3:
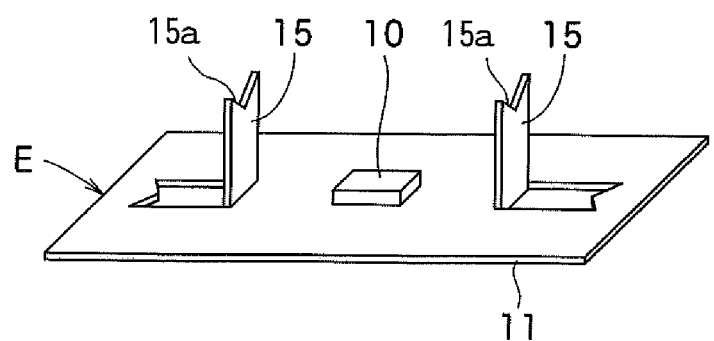
FIG. 3 is a perspective view schematically illustrating an electric circuit unit which forms the opto-electric hybrid board.

On the other hand, the electric circuit unit E includes a substrate 11, and the optical element 10 and a drive IC (not shown) which are mounted on a surface of the substrate 11 via an insulating layer (not shown), as illustrated in FIG. 3 as a perspective view. Further, in the electric circuit unit E, the bent portions 15 which fit into the notch portions 4 (see FIG. 2A), respectively, of the optical waveguide unit W and which are in the shape of a rectangular plate are formed so as to stand upright from the electric circuit unit E. Each of the bent portions 15 is formed by cutting a part of stacked portion of the substrate 11 and the insulating layer so as to be substantially U-shaped and bending a tongue portion surrounded by the substantially U-shaped cut so as to stand upright with respect to the stacked portion, and is located and formed at a predetermined location with respect to the optical element 10. In this embodiment, the bent portions 15 are formed on both sides of the optical element 10 (in two places), each of the bent portions 15 is formed in the shape of a substantially rectangular plate having a V-shaped notch portion 15a formed therein at a tip (upper end in FIG. 3) thereof, and the width of the V-shaped notch portion 15a gradually decreases toward the valley of the notch (downward in FIG. 3).

Note that, on the surface of the insulating layer, there is formed an electric circuit (not shown) which is connected to the drive IC, and further, an optical element location defining electrode (not shown) used as a guide when the optical element 10 is located and formed, and bent portion locating circuits (not shown) used as guides when the bent portions 15 are located and formed. The bent portion locating circuits are formed along the substantially U-shaped cuts forming the tongue portions which are to be the bent portions 15. Further, a plating layer (not shown) is formed on surfaces of the electric circuit, the optical element location defining electrode, and the bent portion locating circuits. The optical element location defining electrode is formed substantially at the center of the surface of the insulating layer, and the optical element 10 is mounted at a predetermined location with respect to the optical element location defining electrode. The optical element 10 and the drive IC are electrically connected to each other by wire bonding, and the drive IC and an electrode pad (a part of the electric circuit) are electrically connected to each other by wire bonding. With this state, the optical element 10 and portions therearound are encapsulated in resin (not shown). In this embodiment, a wire bonding type element is used as the optical element 10, and a light-emitting portion or a light-receiving portion thereof is formed on a surface (upper surface in FIG. 3) of the optical element 10. Note that, the drive IC is, for example, a driver for driving a light-emitting element (optical element 10) or a trans-impedance amplifier (TIA) for amplifying a signal from a light-receiving element (optical element 10).

In the opto-electric hybrid board, as illustrated in FIG. 1, the optical waveguide unit W and the electric circuit unit E are coupled to be integral in a state in which the notch portions 4 of the optical waveguide unit W fit into the bent portions 15 of the electric circuit unit E. Here, as described above, the notch portions 4 formed in the optical waveguide unit W are located and formed at the predetermined locations with respect to the one end surface 2a of the core 2. Further, the bent portions 15 formed in the electric circuit unit E are located and formed at the predetermined locations with respect to the optical element 10. Therefore, by fitting the notch portions 4 into the bent portions 15, the one end surface 2a of the core 2 and the optical element 10 are appropriately located in an aligned state automatically.

Further, in this embodiment, the notch portions 4 in the optical waveguide unit W are formed so as to be Y-shaped, the V-shaped notch portions 15a are formed at tips of the substantially rectangular bent portions 15 of the electric circuit unit E, and, under the fitting state, the corner portion at the bottom of the valley of the V-shaped notch portion 15a at the tip of each of the bent portions 15 of the electric circuit unit E is located in the corner portion at the bottom of the valley of each of the Y-shaped notch portions 4 in the optical waveguide unit W. Therefore, the fitting is less liable to be lost. As a result, misalignment of the optical waveguide unit W with respect to the electric circuit unit E is prevented with greater reliability, and the alignment between the core 2 and the optical element 10 may be maintained with greater reliability.

The opto-electric hybrid board is manufactured through the following steps (1) to (3):
(1) a step of manufacturing the optical waveguide unit W (see FIGS. 4A to 4D);
(2) a step of manufacturing the electric circuit unit E (see FIGS. 5A to 5C and FIGS. 6A to 6C); and
(3) a step of coupling the optical waveguide unit W to the electric circuit unit E (see FIG. 7).

<(1) Step of Manufacturing Optical Waveguide Unit W>

The step of manufacturing the optical waveguide unit W of the above-mentioned item (1) is described. First, a plate-like base 20 (see FIG. 4A) used when the undercladding layer 1 is formed is prepared. The forming material for the base 20 is, for example, glass, quartz, silicon, a resin, or a metal. Among them, a substrate formed of a stainless steel is preferred, because a substrate formed of a stainless steel is excellent in resistance to expansion and contraction due to heat and various dimensions thereof are substantially maintained at design values in the process of manufacturing the optical waveguide unit W. Further, the thickness of the base 20 is set within a range of, for example, 20 µm to 1 mm.

Figure 4A:
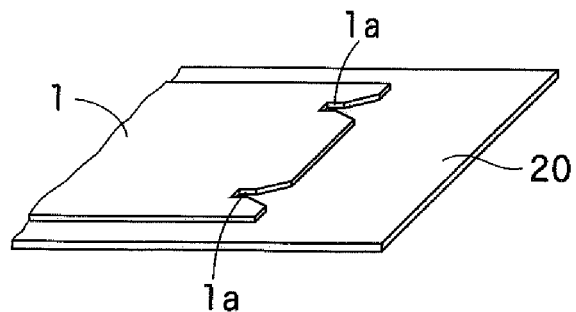
FIGS. 4A to 4D are explanatory views schematically illustrating manufacturing steps for the optical waveguide unit in a manufacturing method for the opto-electric hybrid board.

Next, as illustrated in FIG. 4A, the undercladding layer 1 is formed by photolithography in a predetermined region on a surface of the base 20, the undercladding layer 1 having, in two places, atone edge thereof, notch portions 1a which are Y-shaped in plan view. As the forming material for the undercladding layer 1, a photosensitive resin such as a photosensitive epoxy resin is used. The thickness of the undercladding layer 1 is set within a range of, for example, 5 to 50 µm.

Figure 4B:
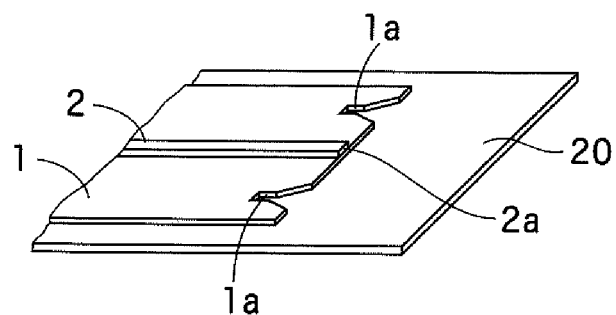

Then, as illustrated in FIG. 4B, the core 2 in the predetermined pattern is formed by photolithography on the surface of the undercladding layer 1. Here, the one end surface (light transmitting surface) 2a of the core 2 is located at a predetermined location between the notch portions 1a in the two places on the surface of the undercladding layer 1 with reference to the notch portions 1a in the two places. The locating of the core 2 is carried out by, in a state in which a photomask formed with reference to the notch portions 1a in the two places is placed with respect to the notch portions 1a in the two places, performing exposure via the photomask when the core 2 is formed by photolithography.

The forming material for the core 2 is, for example, a photosensitive resin similar to the case of the undercladding layer 1, and a material having a refractive index higher than those of forming materials for the undercladding layer 1 and the overcladding layer 3 (see FIG. 4C) is used. The adjustment of the refractive index may be made by, for example, selecting the kinds of and adjusting the composition ratios of the forming materials for the undercladding layer 1, the core 2, and the overcladding layer 3. The number of the cores may be one or more than one (one in the case illustrated in FIG. 4B). The pattern of the core 2 is, for example, in the shape of a straight line, branched, or crossed, or may be a combination thereof (in the shape of a straight line in the case illustrated in FIG. 4B). The thickness of the core 2 is set within a range of, for example, 20 to 100 µm. The width of the core 2 is set within a range of, for example, 20 to 100 µm.

Figure 4C:
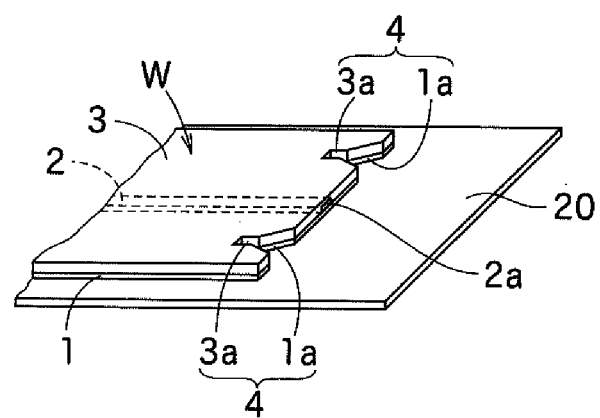

Then, as illustrated in FIG. 4C, the overcladding layer 3 is formed by photolithography on the surface of the undercladding layer 1 so as to cover the core 2. Here, notch portions 3a in the same shape as that of the notch portions 1a are formed on the notch portions 1a of the undercladding layer 1. The forming material for the overcladding layer 3 is, for example, a photosensitive resin similar to the case of the undercladding layer 1. The thickness of the overcladding layer 3 (thickness from the surface of the undercladding layer 1) is set within a range of, for example, a thickness greater than the thickness of the core 2 and a thickness of 1,000 µm or smaller.

Here, stacked portions of the notch portions 1a of the undercladding layer 1 and the notch portions 3a of the overcladding layer formed thereon are the notch portions 4 for locating the electric circuit unit. As described above, the one end surface 2a of the core 2 is located and formed at the predetermined location with respect to the notch portions 1a of the undercladding layer 1, and thus, the notch portions 4 formed by stacking the protruding pieces 3a of the overcladding layer on the notch portions 1a are located and formed at the predetermined locations with respect to the one end surface 2a of the core 2. With regard to the dimensions of the notch portions 4, for example, the depth is set within a range of 0.1 to 5 mm and the notch width is set within a range of 5 µm (width of a constant width portion on the valley side of the Y-shape) to 5 mm (maximum width on the widened open side of the Y-shape).

Figure 4D:
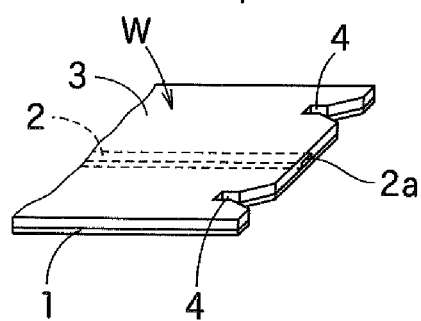

Then, as illustrated in FIG. 4D, the base 20 (see FIG. 4C) is separated from a rear surface of the undercladding layer 1. With the separation, the optical waveguide unit W is obtained, which includes the undercladding layer 1, the core 2, and the overcladding layer 3 and in which the notch portions 4 for locating the electric circuit unit are formed in the stacked portions of the undercladding layer 1 and the overcladding layer 3. The thickness of the optical waveguide unit W is set within a range of, for example, 30 to 1,150 µm. In this way, the step of manufacturing the optical waveguide unit W of the above-mentioned item (1) is completed.

<(2) Step of Manufacturing Electric Circuit Unit E>

Next, the step of manufacturing the electric circuit unit E of the above-mentioned item (2) is described with reference to FIGS. 5A to 5C and FIGS. 6A to 6C. In each of FIGS. 5A to 5C and FIGS. 6A to 6C, two figures are illustrated in an upper side and a lower side thereof, and the figure in the upper side is a plan view and the figure in the lower side is a longitudinal cross-sectional view thereof.

First, the substrate 11 (see FIG. 5A) is prepared. The forming material for the substrate 11 is, for example, a metal or a resin. Among them, a substrate formed of a stainless steel is preferred from the viewpoint of easy processability and dimensional stability. Further, the thickness of the substrate 11 is set within a range of, for example, 0.02 to 0.1 mm.

Figure 5A:
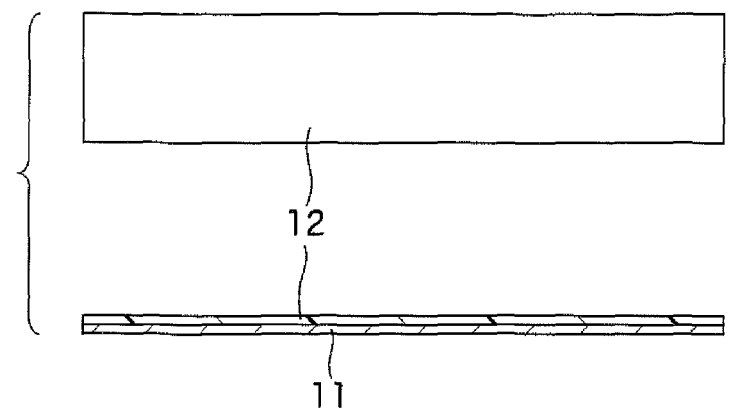
FIGS. 5A to 5C are explanatory views schematically illustrating manufacturing steps for the electric circuit unit in the manufacturing method for the opto-electric hybrid board.

Then, as illustrated in FIG. 5A, an insulating layer 12 is formed in a predetermined region of the surface of the substrate 11. With regard to the formation of the insulating layer 12, for example, varnish in which a photosensitive resin such as a photosensitive polyimide resin for forming an insulating layer is dissolved in a solvent is applied, and then, as necessary, the layer formed by applying the varnish is dried by heating treatment to form a photosensitive resin layer for forming the insulating layer. Then, by exposing the photosensitive resin layer to a radiation ray such as an ultraviolet ray via a photomask, the insulating layer 12 in a predetermined shape is formed. The thickness of the insulating layer 12 is set within a range of, for example, 5 to 15 μm.

Figure 5B:
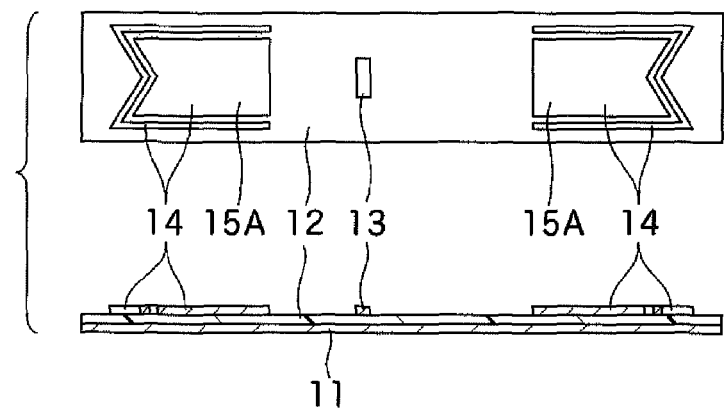

Then, as illustrated in FIG. 5B, the electric circuit (not shown), an optical element location defining electrode 13, and bent portion locating circuits 14 are simultaneously formed on a surface of the insulating layer 12, to thereby manufacture an electric circuit board. The formation of the electric circuit and the like is carried out by, for example, a semi-additive process.

More specifically, first, a metal layer (having a thickness of about 60 to 260 nm) is formed on the surface of the insulating layer 12 by sputtering, electroless plating, or the like. The metal layer becomes a seed layer when electrolytic plating is applied later (layer to be a base metal when an electrolytic plating layer is formed). Then, after dry film resists are adhered to both surfaces of a laminate including the substrate 11, the insulating layer 12, and the seed layer, hole portions of the pattern of the electric circuit and the like are simultaneously formed by photolithography in the dry film resist on a side having the seed layer formed thereon, and surface portions of the seed layer are exposed at the bottom of the hole portions. Then, an electrolytic plating layer (having a thickness of about 5 to 20 μm) is stacked by electrolytic plating on the surface portions of the seed layer exposed at the bottom of the hole portions. Then, the dry film resists are separated by a sodium hydroxide solution or the like. After that, portions of the seed layer which do not have the electrolytic plating layer formed thereon are removed by soft etching, and a stacked portion including the remaining electrolytic plating layer and the seed layer thereunder is formed into the electric circuit and the like. In this way, the electric circuit board is obtained, which includes the substrate 11, the insulating layer 12, the electric circuit, the optical element location defining electrode 13, and the bent portion locating circuits 14.

Figure 5C:
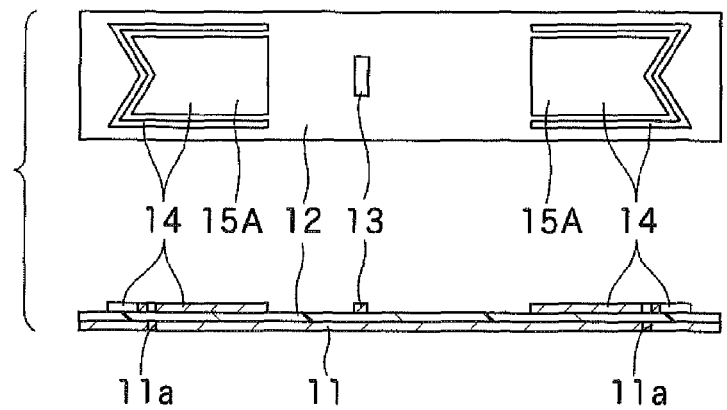

Then, the electric circuit board is set in an exposure machine, an image of a front surface side (electric circuit side) and an image of a rear surface side (substrate 11 side) are taken by a camera. Based on the images, the locations of expected bent portion forming portions (tongue portions 15A) on the rear surface side are appropriately located with the bent portion locating circuits 14 on the front surface side being used as guides. Then, the rear surface side except for expected substantially U-shaped cut forming portions for forming the tongue-like expected bent portion forming portions is covered with a dry film resist (not shown). Next, as illustrated in FIG. 5C, the exposed portions of the substrate 11 at the expected substantially U-shaped cut forming portions are removed by etching using a ferric chloride solution. The etching exposes the portions of the insulating layer 12 from portions 11a removed by the etching.

Figure 6A:
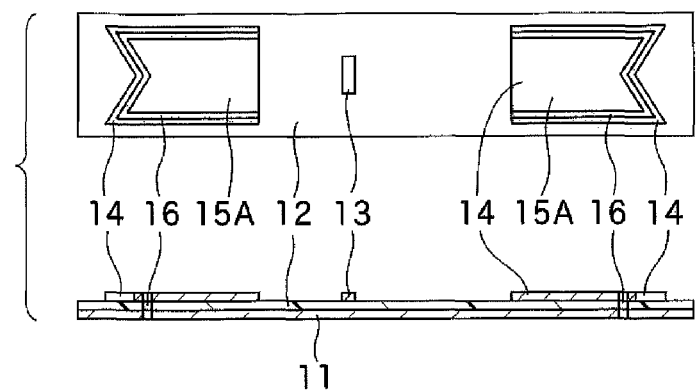
FIGS. 6A to 6C are explanatory views schematically illustrating manufacturing steps for the electric circuit unit, which are performed subsequently to those of FIGS. 5A to 5C.

Then, as illustrated in FIG. 6A, the exposed portions of the insulating layer 12 are removed by etching using a chemical etchant. The etching forms the expected substantially U-shaped cut forming portions into U-shaped cuts 16 (substantially U-shaped through openings). Then, by performing electrolytic plating processing, a plating layer (not shown) is formed on surfaces of the electric circuit, the optical element location defining electrode 13, and the bent portion locating circuits 14. After that, the dry film resist is separated by a sodium hydroxide solution or the like. Note that, examples of the component of the plating layer include gold, nickel, or the like. Further, the thickness of the plating layer is ordinarily set within a range of, for example, 0.2 to 0.5 μm.

Figure 6B:
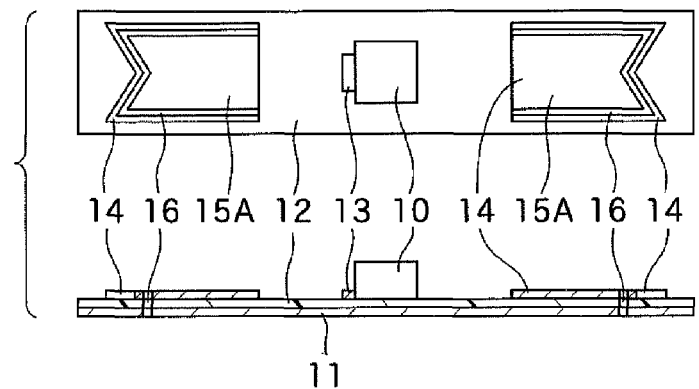

Then, as illustrated in FIG. 6B, the optical element 10 and the drive IC (not shown) are mounted (die bonded) at the predetermined location with reference to the optical element location defining electrode 13. Next, the optical element 10 and the drive IC are electrically connected to each other by wire bonding, and the drive IC and the electrode pad (a part of the electric circuit) are electrically connected to each other by wire bonding. After that, the optical element 10 and portions therearound are encapsulated in resin (not shown).

Figure 6C:
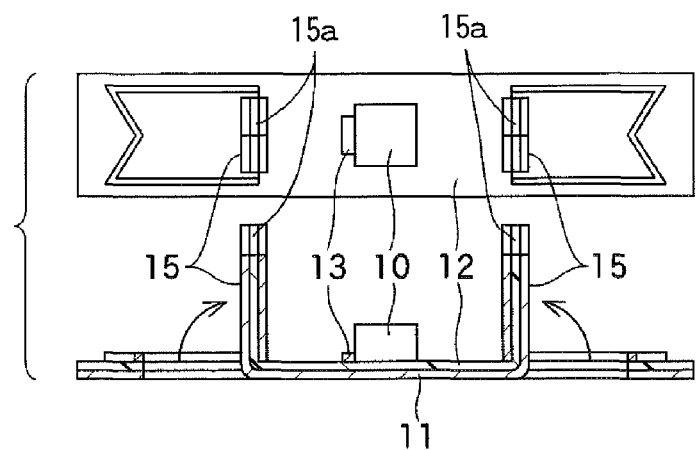

Then, as illustrated in FIG. 6C, each of the tongue portions 15A surrounded by the substantially U-shaped cuts 16 (see FIG. 6A), respectively, is bent down so as to stand perpendicularly to the electric circuit board to be formed into the bent portion 15. In this way, the electric circuit unit E having the bent portions 15 is obtained. The bent portions 15 are formed with reference to the bent portion locating circuits 14 which are formed simultaneously with the optical element location defining electrode 13 by the semi-additive process, and thus the bent portions 15 are located and formed at predetermined locations with respect to the optical element location defining electrode 13. Therefore, the bent portions 15 and the optical element 10 which are mounted at the predetermined locations with respect to the optical element location defining electrode 13 are in a positional relationship of being located with respect to each other. Note that, the height of the bent portions 15 (in this embodiment, the height of the corner portion (bottom portion) of the V-shaped notch portion 15a formed at the tip) is set to be larger than the depth of the notch portions 4 (see FIG. 1) of the optical waveguide unit into which the bent portions 15 fit. In this way, the step of manufacturing the electric circuit unit E of the above-mentioned item (2) is completed.

<(3) Step of Coupling Optical Waveguide Unit W and Electric Circuit Unit E>

Figure 7:
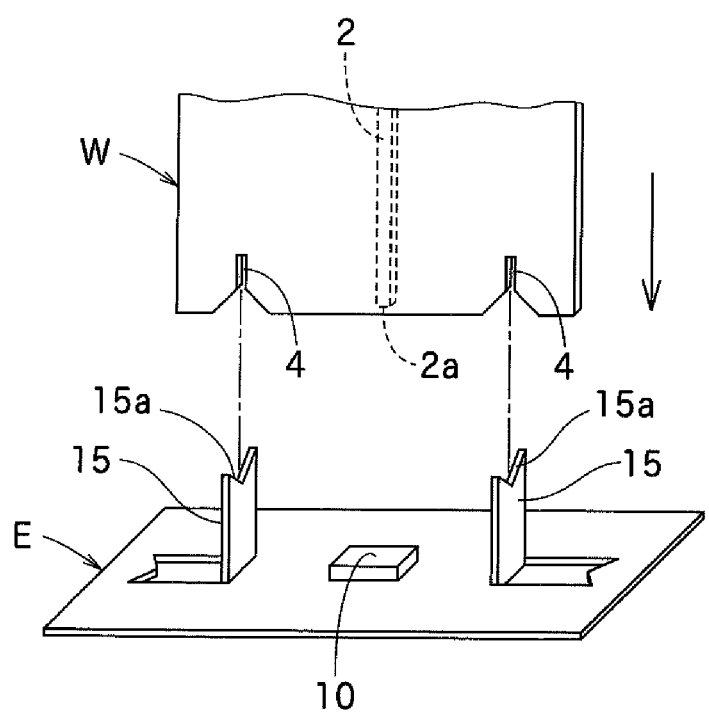
FIG. 7 is an explanatory view schematically illustrating manufacturing steps for the opto-electric hybrid board.

Next, the step of coupling the optical waveguide unit W and the electric circuit unit E is described. In this coupling, as illustrated in FIG. 7 as a perspective view, in a state in which the optical element 10 of the electric circuit unit E and the one end surface 2a of the core 2 of the optical waveguide unit W face each other, the notch portions 4 of the optical waveguide unit W are caused to fit into the bent portions 15 of the electric circuit unit E to integrate the optical waveguide unit W and the electric circuit unit E. After that, as necessary, the portions at which the notch portions 4 fit into the bent portions 15, respectively, may be fixed with an adhesive. Then, the optical waveguide unit W is bent as illustrated in FIG. 1. In this way, the step of coupling the optical waveguide unit W and the electric circuit unit E of the above-mentioned item (3) is completed, and the opto-electric hybrid board is completed which is the goal.

Here, as described above, in the optical waveguide unit W, the one end surface 2a of the core 2 and the notch portions 4 for locating the electric circuit unit are in a positional relationship of being located with respect to each other. Further, in the electric circuit unit E having the optical element 10 mounted thereon, the optical element 10 and the bent portions 15 into which the notch portions 4 fit, respectively, are in a positional relationship of being located with respect to each other. Therefore, when the notch portions 4 are caused to fit into the bent portions 15, respectively, as described above to manufacture the opto-electric hybrid board, the one end surface 2a of the core 2 and the optical element 10 are automatically aligned. As a result, in manufacturing the opto-electric hybrid board, an aligning operation which takes time and effort is not necessary. In other words, the opto-electric hybrid board is excellent in mass-productivity.

In addition, the notch portions 4 of the optical waveguide unit W are provided in predetermined portions of the undercladding layer 1 and the overcladding layer 3 which form the optical waveguide unit W. Further, the bent portions 15 of the electric circuit unit E are formed of a part of the electric circuit board which forms the electric circuit unit E. In other words, an additional component such as a connector is not provided for the purpose of fitting the notch portions 4 into the bent portions 15. Therefore, in the coupling between the optical waveguide unit W and the electric circuit unit E, there is no accumulation of dimensional deviations and misalignments due to an additional component such as a connector, and the core 2 of the optical waveguide unit W and the optical element 10 of the electric circuit unit E are aligned with high accuracy. Further, an additional component such as a connector is not necessary for the fit between the notch portions 4 and the bent portions 15, and thus control of the dimensional accuracy of the connector or the like is not necessary. In this regard, also, the opto-electric hybrid board is excellent in mass-productivity.

Figure 8:
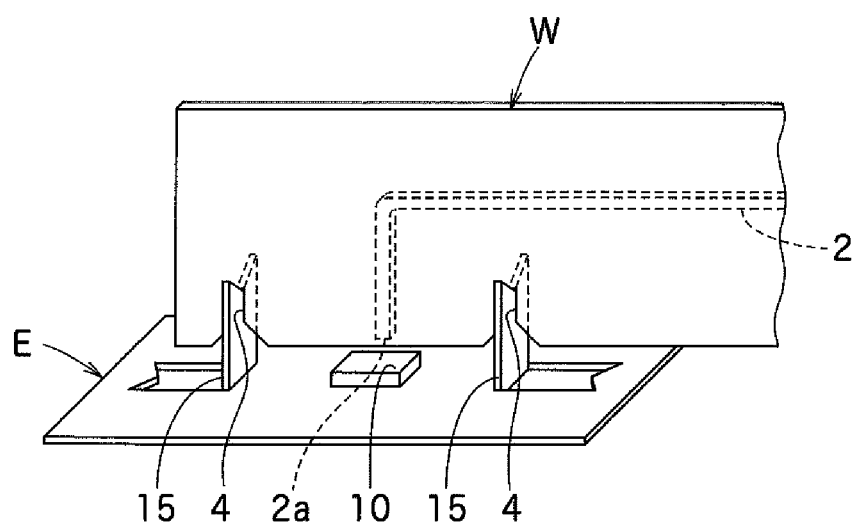
FIG. 8 is a perspective view schematically illustrating a second embodiment of the opto-electric hybrid board.

FIG. 8 is a perspective view schematically illustrating a second embodiment of the opto-electric hybrid board. In this embodiment, the core 2 of the optical waveguide unit W is curved toward one side edge of the optical waveguide unit W at one end thereof, and in accordance with the curve, the notch portions 4 which fit into the bent portions 15, respectively, of the electric circuit unit E are formed at the one side edge of the optical waveguide unit W. The other portions of the optical waveguide unit W and the electric circuit unit E are similar to those of the first embodiment illustrated in FIG. 1, and like reference numerals are used to designate like members. The second embodiment produces actions and effects similar to those of the first embodiment. Note that, with regard to the curved structure of the core 2, the curve may have, for example, a radius of curvature of 0.5 to 10 mm.

Further, in the above-mentioned first and second embodiments, the notch portions 4 in the optical waveguide unit W are Y-shaped and the notch portions 15a at the tips of the bent portions 15 of the electric circuit unit E are V-shaped, but the notch portions 4 and the notch portions 15a may be otherwise shaped. For example, the shapes may be reverse to the above-mentioned shapes, i.e., the notch portions 4 in the optical waveguide unit W may be V-shaped and the notch portions 15a in the bent portions 15 of the electric circuit unit E may be Y-shaped. Further, both may be Y-shaped, or both may be V-shaped. Still further, it may be that the notch portions 4 in the optical waveguide unit W are rectangular and the notch portions 15a are not formed in the bent portions 15 of the electric circuit unit E.

Figure 9A:
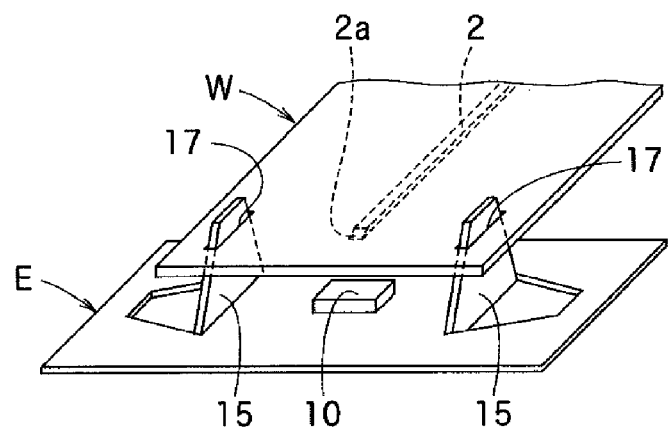
FIG. 9A is a perspective view schematically illustrating a third embodiment of the opto-electric hybrid board.

FIG. 9A is a perspective view schematically illustrating a third embodiment of the opto-electric hybrid board. In this embodiment, instead of the notch portions 4 of the first embodiment illustrated in FIG. 1, rectangular through holes (fitting holes) 17 are formed in the optical waveguide unit W for locating the electric circuit unit. The bent portions 15 of the electric circuit unit E fit into the through holes 17, respectively. By the fitting, the optical waveguide unit W and the electric circuit unit E are coupled to be integral in a state in which the optical waveguide unit W and the electric circuit unit E are parallel with each other. Note that, in this embodiment, each of the bent portions 15 of the electric circuit unit E is formed to be trapezoidal the width of which gradually decreases toward a tip side (upper end side in the figure), the tip thereof is formed so as to be flat, and the notch portion 15a (see FIG. 3) is not formed at the tip.

Figure 9B:
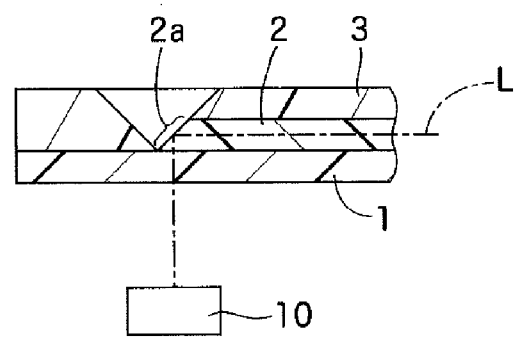
FIG. 9B is an enlarged longitudinal sectional view of a principal part of one end illustrated in FIG. 9A.

Further, at one end (an end on a front side of FIG. 9A) of the optical waveguide unit W, as illustrated in FIG. 9B as a longitudinal sectional view of a principal part thereof, an inclined surface which is inclined 45° with respect to an axial direction of the core 2 is formed. One end surface 2a of the core 2 which is positioned at the inclined surface is a light reflecting surface. More specifically, the one end surface 2a of the core 2 reflects light so that the light may be transmitted between the core 2 and the optical element 10 (see the dot-and-dash line L in the figure). The inclined surface is formed by cutting using a rotary blade, laser processing, or the like in a last step of the manufacturing steps for the optical waveguide unit W at a predetermined location with reference to the through holes 17.

Figure 9C:
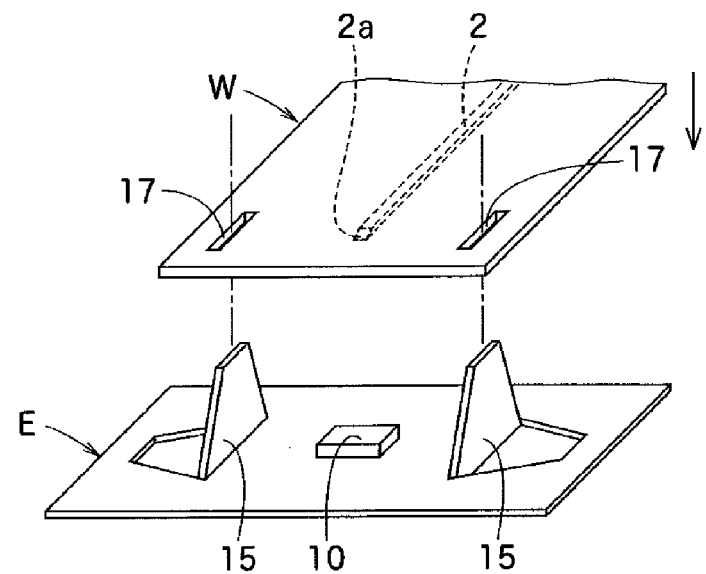
FIG. 9C is an explanatory diagram illustrating the manufacturing steps of FIG. 9A.

With regard to manufacture of the opto-electric hybrid board of this embodiment, as illustrated in FIG. 9C, the optical waveguide unit W and the electric circuit unit E are integrated by causing the bent portions 15 of the electric circuit unit E to fit into the through holes 17 in the optical waveguide unit W, respectively. Other portions are similar to those of the first embodiment illustrated in FIG. 1, and like reference numerals are used to designate like members. Actions and effects similar to those of the first embodiment are produced.

Figure 10:
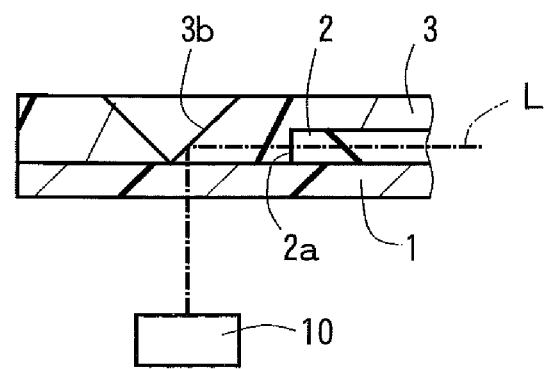
FIG. 10 is an enlarged longitudinal sectional view schematically illustrating a modification example of the one end of the optical waveguide unit of the third embodiment.

Note that, in the third embodiment, at the inclined surface of the one end surface of the optical waveguide unit W, the one end surface 2a of the core 2 which is positioned at the inclined surface is formed into the light reflecting surface, but, as illustrated in FIG. 10 as a longitudinal sectional view, it may be that one end surface 3b of the overcladding layer 3 is formed into an inclined light reflecting surface so that light may be transmitted between the core 2 and the optical element 10 (see the dot-and-dash line L in the figure). More specifically, also in this case, the one end surface 2a of the core 2 is formed at a predetermined location with reference to the through holes 17 (see FIG. 9C), and is aligned with the optical element 10.

FIGS. 11A to 11D schematically illustrate a method using molding as another manufacturing step (manufacturing method) for the overcladding layer 3 having the notch portions 3a (see FIG. 4C) in manufacturing the optical waveguide unit W. Specifically, in the above-mentioned first and second embodiments, the overcladding layer 3 having the notch portions 3a is formed by photolithography, but the overcladding layer 3 may be formed by molding, which is carried out as follows.

Figure 11A:
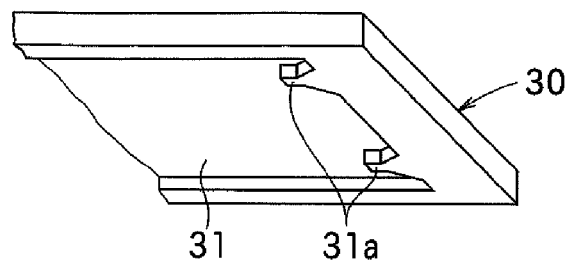
FIGS. 11A to 11D are explanatory views schematically illustrating another series of manufacturing steps for the optical waveguide unit.
Figure 11B:
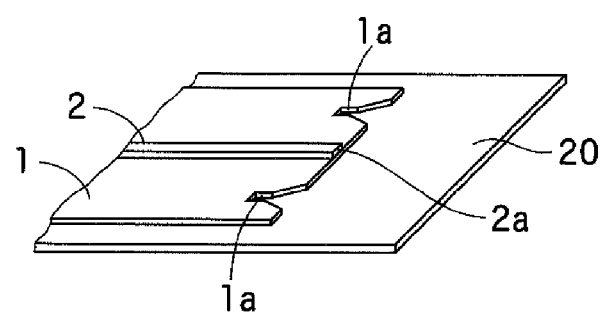
Figure 11C:
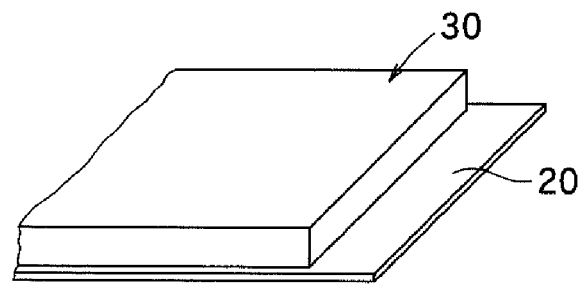
Figure 11D:
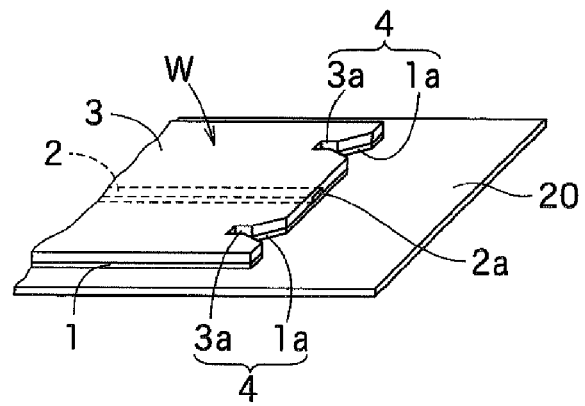

More specifically, first, as illustrated in FIG. 11A, a mold 30 is prepared which has in a lower surface thereof a recess having a mold surface 31 corresponding to the shape of the overcladding layer 3 having the notch portions 3a. Then, as illustrated in FIG. 11B, the undercladding layer 1 is formed on the surface of the base 20. In a state in which the core 2 is formed in the predetermined pattern on the surface of the undercladding layer 1 (similar to the state illustrated in FIG. 4B), the lower surface of the mold 30 is brought into intimate contact with the surface of the base 20 as illustrated in FIG. 11C. Here, portions 31a of the mold surface of the mold 30 corresponding to the notch portions 3a are located over the notch portions 1a of the undercladding layer 1, respectively. Then, a resin for forming the overcladding layer is injected into mold space surrounded by the surface of the undercladding layer 1 having the notch portions 1a, the mold surface 31 of the mold 30, and the surface of the core 2, through an injection hole (not shown) formed in the mold 30. Thus, the mold space is filled with the resin. Then, in a case where the resin is a photosensitive resin, exposure is carried out by applying a radiation ray such as an ultraviolet ray via the mold 30, and then heating treatment is carried out. In a case where the resin is a thermosetting resin, heating treatment is carried out. This cures the resin for forming the overcladding layer to form the overcladding layer 3 having the notch portions 3a. After that, the mold is stripped off, and, as illustrated in FIG. 11D, a structure similar to that illustrated in FIG. 4C is obtained. The formation may be carried out in this way.

Note that, the overcladding layer 3 having the through holes 17 formed therein of the third embodiment (see FIG. 9B) may also be formed by molding similarly to the above (see FIGS. 11A to 11D). In this case, the shape of the mold surface 31 of the mold 30 corresponds to the shape of the overcladding layer 3 having the through holes 17 formed therein.

FIGS. 12A to 12D schematically illustrate manufacturing steps for the optical waveguide unit W in another form. Specifically, in the above-mentioned respective embodiments, the notch portions 4 for locating the electric circuit unit in the optical waveguide unit W are formed in the stacked portions of the undercladding layer 1 and the overcladding layer 3 (see FIG. 4C), but the notch portions 4 may be formed only in the overcladding layer 3. Manufacturing steps (manufacturing method) for the optical waveguide unit W are as follows.

Figure 12A:
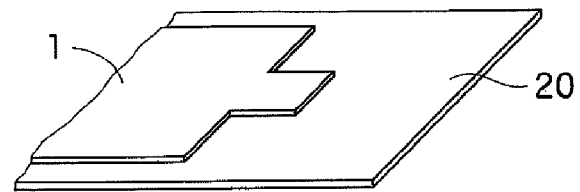
FIGS. 12A to 12D are explanatory views schematically illustrating manufacturing steps for the optical waveguide unit in another form.
Figure 12B:
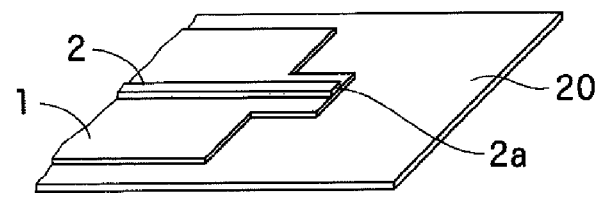
Figure 12C:
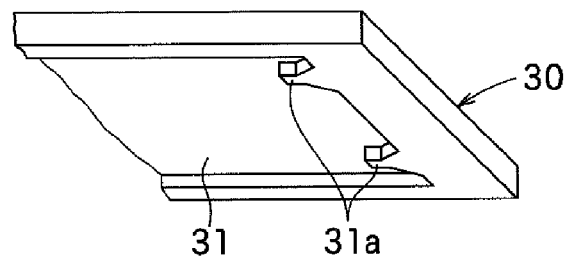
Figure 12D:
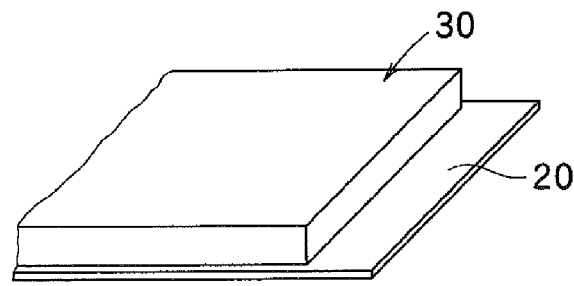
Figure 13:
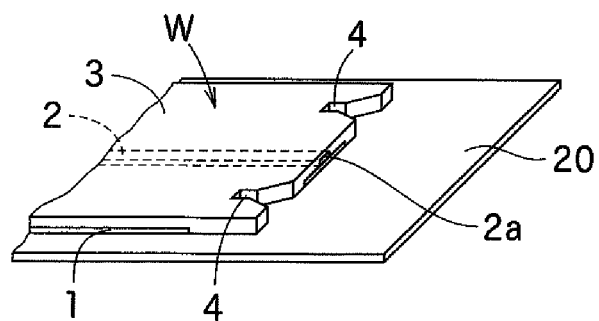
FIG. 13 is a perspective view schematically illustrating the optical waveguide unit in another form.

More specifically, first, as illustrated in FIG. 12A, the undercladding layer 1 without the notch portions 1a (see FIG. 4A) is formed in a predetermined region except for an expected forming region for the notch portions 4 (3a) on the surface of the base 20 by photolithography. Then, as illustrated in FIG. 12B, the core 2 in the predetermined pattern is formed by photolithography on the surface of the undercladding layer 1. Next, as illustrated in FIG. 12C, a mold 30 is prepared which has in a lower surface thereof a recess having a mold surface 31 corresponding to the shape of the overcladding layer 3 including the notch portions 4 (3a). Then, as illustrated in FIG. 12D, the lower surface of the mold 30 is brought into intimate contact with the surface of the base 20. Here, portions 31a of the mold surface of the mold 30 corresponding to the notch portions 4 (3a) are located with respect to the one end surface 2a of the core 2. Then, a resin for forming the overcladding layer is injected into mold space surrounded by the mold surface 31 of the mold 30, the surface of the base 20, the surface of the undercladding layer 1, and the surface of the core 2, through an injection hole (not shown) formed in the mold 30. Thus, the mold space is filled with the resin. After that, similarly to the method described above with reference to FIG. 11C, the overcladding layer 3 including the notch portions 4 (3a) is formed. After that, the mold is stripped off, and, as illustrated in FIG. 13, the optical waveguide unit W in which the notch portions 4 (3a) are formed only in the overcladding layer 3 is obtained on the surface of the base 20. Alternatively, the overcladding layer 3 may be formed by, instead of the above-mentioned molding (see FIGS. 12C and 12D), photolithography.

Note that, in the above embodiment (see FIGS. 12A to 12D), the notch portions 4 (3a) for locating the electric circuit unit are formed only in the overcladding layer 3, but the notch portions 4 (1a) for locating the electric circuit unit may be formed only in the undercladding layer 1. Manufacturing steps (manufacturing method) for such an optical waveguide unit W are as follows. The undercladding layer 1 having the notch portions 1a is formed on the surface of the base 20. In a state in which the core 2 is formed in the predetermined pattern on the surface of the undercladding layer 1 (similar to the state illustrated in FIG. 4B), the overcladding layer 3 without the notch portions 3a (see FIG. 4C) is formed by molding or by photolithography, and thus the optical waveguide unit W may be manufactured.

Figure 14A:
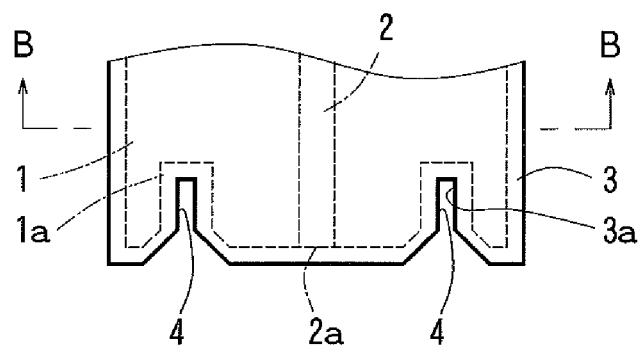
FIG. 14A is a front view thereof and FIG. 14B is a sectional view taken along the line B-B of FIG. 14A.
Figure 14B:
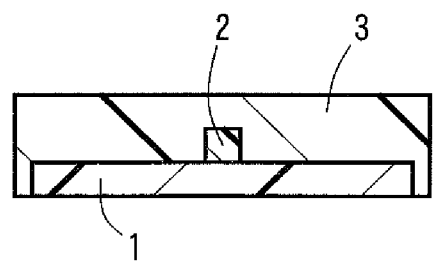

FIGS. 14A and 14B schematically illustrate the optical waveguide unit W instill another form. In this embodiment, as illustrated in FIG. 14A as a front view and FIG. 14B as a sectional view taken along the line B-B of FIG. 14A, the overcladding layer 3 is formed so as to be slightly larger than the undercladding layer 1. Such an optical waveguide unit W may also be manufactured by molding or by photolithography described above.

When the notch portions 4 for locating the electric circuit unit are formed by molding as described above (see FIGS. 11A to 11C, FIGS. 12A to 12D, and FIGS. 14A and 14B), the thickness of the notch portions 4 may be formed to be thick, and thus, in a state in which the notch portions 4 fit into the bent portions 15 of the electric circuit unit E, the strength of the fitting portions may be enhanced.

Figure 15:
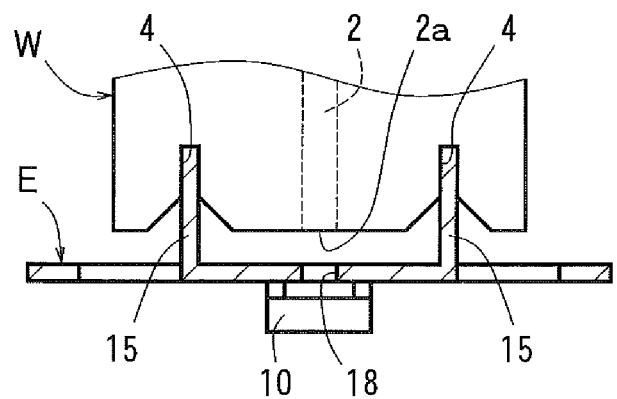
FIG. 15 is a sectional view schematically illustrating a fifth embodiment of the opto-electric hybrid board.

Note that, in the above-mentioned respective embodiments, an element of the wire bonding type is used as the optical element 10, but an element of a flip chip type may also be used. When such an element of a flip chip type is used, the light-emitting portion or the light-receiving portion is formed on a surface on which the optical element 10 is mounted (rear surface), and thus, as illustrated in FIG. 15, the optical waveguide unit W is fitted into the electric circuit unit E from the side on which the optical element 10 is not mounted, and a through hole 18 for passing light therethrough is formed at a portion of the electric circuit unit E which corresponds to the light-emitting portion or the light-receiving portion.

Further, in the above-mentioned respective embodiments, description is made with regard to one end of the opto-electric hybrid board, but the other end may have a structure which is similar to that of the one end of the above-mentioned respective embodiments. In this case, as the optical element 10, by, for example, mounting a light-emitting element on the one end side and mounting a light-receiving element on the other end side, light from the light-emitting element may be received by the light-receiving element via the core 2.

Further, in the above-mentioned respective embodiments, in the manufacturing steps for the electric circuit unit E, the plating layer is formed on the surfaces of the electric circuit, the optical element location defining electrode 13, and the bent portion locating circuit 14, but the plating layer is formed as necessary, and is not required to be formed when unnecessary.

Next, examples are described. However, the present invention is not limited to the examples.

EXAMPLES

Forming Materials for Undercladding Layer and Overcladding Layer

Component A (solid epoxy resin): epoxy resin including an aromatic ring skeleton (EPICOAT 1002 manufactured by Mitsubishi Chemical Corporation)
70 Parts by Weight
Component B (solid epoxy resin): epoxy resin including an alicyclic skeleton (EHPE3150 manufactured by Daicel Chemical Industries Ltd.) 30 parts by weight
Component C (photoacid generator): triarylsulfonium salt, 50% solution in propylene carbonate (CPI-200K manufactured by San-Apro Ltd.)

2 Parts by Weight

Those Components A to C were dissolved in 55 parts by weight of ethyl lactate (produced by Musashino Chemical Laboratory, Ltd.) through agitation (temperature at 80° C. and agitation of 250 rpm for 3 hours) to prepare the undercladding layer and overcladding layer forming material (photosensitive resin composition). The viscosity of the photosensitive resin composition was measured using a digital viscometer (HBDV-I+CP manufactured by Brookfield Engineering Laboratories). The viscosity was 1,320 MPa·s.

<Forming Material for Core>

Component D: o-cresol novolak glycidyl ether (YDCN-700-10 manufactured by Nippon Steel Chemical Co., Ltd) 100 parts by weight This Component D and 1 part by weight of the above-mentioned Component C were dissolved in 60 parts by weight of ethyl lactate (produced by Musashino Chemical Laboratory, Ltd.) through agitation (temperature at 80° C. and agitation of 250 rpm for 3 hours) to prepare the core forming material (photosensitive resin composition). The viscosity of the photosensitive resin composition was measured using the digital viscometer. The viscosity was 1,900 mPa·s.

Example 1

Manufacture of Optical Waveguide Unit

The above-mentioned undercladding layer, core, and overcladding layer forming materials were used to manufacture the optical waveguide unit having the Y-shaped notch portions for locating the electric circuit unit similarly to the case of the first embodiment. With regard to the dimensions of the Y-shaped notch portions, the depth as a whole was 0.5 mm, the depth of a constant width portion on the valley side of the Y-shape was 0.25 mm, the width of the constant width portion was 0.1 mm, the maximum width on the open side of the Y-shape was 0.4 mm, and the center-to-center distance between the adjacent notch portions was 6.0 mm.

<Manufacture of Electric Circuit Unit>

The electric circuit unit having the rectangular bent portions which fit into the notch portions for locating the electric circuit unit and which have Y-shaped notch portions formed therein at the tips of the bent portions, respectively, was manufactured similarly to the case of the first embodiment. With regard to the dimensions of the bent portions, the width was 4.5 mm and the height was 3.0 mm. With regard to the dimensions of the Y-shaped notch portions at the tips, the depth as a whole was 2.5 mm, the depth of a constant width portion on the valley side of the Y-shape was 0.75 mm, the width of the constant width portion was 0.1 mm, the maximum width on the open side of the Y-shape was 0.7 mm, and the center-to-center distance between the Y-shaped notch portions which face each other was 6.0 mm. Note that, as the optical element, a light-emitting element which was usable both as a wire bonding type and as a flip chip type (VCSEL: ULM850-10-CO0104U manufactured by U-L-M Photonics) was mounted.

<Manufacture of Opto-Electric Hybrid Board>

The notch portions in the bent portions of the electric circuit unit were caused to fit into the notch portions in the optical waveguide unit, respectively, to integrate the optical waveguide unit and the electric circuit unit. Then, the fitting portions were fixed with an adhesive.

Example 2

Manufacture of Optical Waveguide Unit

The above-mentioned undercladding layer, core, and overcladding layer forming materials were used to manufacture the optical waveguide unit having the rectangular through holes for locating the electric circuit unit similarly to the case of the third embodiment. With regard to the dimensions of the rectangular through holes, the length was 3.0 mm, the width was 0.1 mm, and the center-to-center distance between the adjacent through holes was 6.0 mm.

<Manufacture of Electric Circuit Unit>

The electric circuit unit having the trapezoidal bent portions which fit into the through holes for locating the electric circuit unit was manufactured similarly to the case of the third embodiment. With regard to the dimensions of the bent portions, the width of the longer parallel side (longer side) was 6.3 mm, the width of the shorter parallel side (shorter side) was 5.4 mm, the height was 0.8 mm, and the center-to-center distance between the bent portions was 6.0 mm. Note that, as the optical element, one which is similar to that used in Example 1 was mounted.

<Manufacture of Opto-Electric Hybrid Board>

The bent portions of the electric circuit unit were caused to fit into the through holes of the optical waveguide unit to integrate the optical waveguide unit and the electric circuit unit. Then, the fitting portions were fixed with an adhesive.

<Light Propagation Test>

A current was caused to flow through the light-emitting element of the opto-electric hybrid board of Examples 1 and 2 and light was caused to exit from the light-emitting element. It was confirmed that light exited from the other end of the core of the opto-electric hybrid board.

Example 3

Manufacture of Optical Waveguide Unit

An optical waveguide unit was manufactured, which was the optical waveguide unit of Example 1 with the other end having, similarly to the one end, Y-shaped notch portion for locating the electric circuit unit. Other portions of Example 3 were formed similarly to those of Example 1.

<Manufacture of Electric Circuit Unit>

An electric circuit unit for sending was manufactured, which was the electric circuit unit of Example 1 having a driver for the light-emitting element mounted thereon. Further, an electric circuit unit for receiving was manufactured, which was the electric circuit unit of Example 1 having, instead of the light-emitting element, a light-receiving element which was usable both as a wire bonding type and as a flip chip type (PD: PDCA04-70-GS manufactured by Albis Optoelectronics) and a TIA for the light-receiving element mounted thereon. With regard to the method of mounting the light-emitting element and the light-receiving element, wire bonding and flip chip were adopted, respectively.

<Manufacture of Opto-Electric Hybrid Board>

Similarly to the case of Example 1, the electric circuit unit for sending was fixed to one end of the optical waveguide unit and the electric circuit unit for receiving was fixed to the other end of the optical waveguide unit.

Example 4

Manufacture of Optical Waveguide Unit

An optical waveguide unit was manufactured, which was the optical waveguide unit of Example 2 with the other end having, similarly to the one end, rectangular through holes for locating the electric circuit unit. Other portions of Example 4 were formed similarly to those of Example 2.

<Manufacture of Electric Circuit Unit>

An electric circuit unit for sending was manufactured, which was the electric circuit unit of Example 2 having a driver for the light-emitting element mounted thereon. Further, an electric circuit unit for receiving was manufactured, which was the electric circuit unit of Example 2 having, instead of the light-emitting element, a light-receiving element which was usable both as a wire bonding type and as a flip chip type (PD: PDCA04-70-GS manufactured by Albis Optoelectronics) and a TIA for the light-receiving element mounted thereon. With regard to the method of mounting the light-emitting element and the light-receiving element, wire bonding and flip chip were adopted, respectively.

<Manufacture of Opto-Electric Hybrid Board>

Similarly to the case of Example 2, the electric circuit unit for sending was fixed to one end of the optical waveguide unit and the electric circuit unit for receiving was fixed to the other end of the optical waveguide unit.

<Signal Transmission Test>

A personal computer which was additionally prepared was used to control the driver and the TIA while a high speed signal was input from the electric circuit unit for sending by a pulse pattern generator, and a signal was read from the electric circuit unit for receiving by an oscilloscope. The signal transmission characteristics of the opto-electric hybrid boards of Examples 3 and 4 were evaluated by eye pattern evaluation. The result was that satisfactory signal transmission could be confirmed in signal transmission of 10 Gbps.

From the result of Examples 1 to 4 above, it can be found that, in the manufacturing method described above, even without an aligning operation of the core of the optical waveguide unit and the optical element (light-emitting element or light-receiving element) of the electric circuit unit, the obtained opto-electric hybrid board may appropriately propagate light.

Note that, a result was obtained that the opto-electric hybrid boards formed as described in the second and third embodiments above and illustrated in FIGS. 11 to 15 could also appropriately propagate light even without an aligning operation as in Examples 1 to 4.

The opto-electric hybrid board according to the present invention may be used in an information-communication device, a signal processing device, or the like, which transmits and processes at high speed a digital audio signal, a digital image signal, or the like.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An opto-electric hybrid board, comprising:
    an optical waveguide unit; and
    an electric circuit unit having an optical element mounted thereon, the electric circuit unit being coupled to the optical waveguide unit,
    wherein the optical waveguide unit comprises:
        an undercladding layer;
        a core for an optical path, the core being formed on a surface of the undercladding layer;
        an overcladding layer which covers the core; and
        a notch portion or a through hole for locating the electric circuit unit, the notch portion or the through hole being formed in a portion of at least one of the undercladding layer and the overcladding layer;
    wherein the electric circuit unit comprises:
        an electric circuit board;
        the optical element mounted at a predetermined portion on the electric circuit board; and
        a bent portion formed by bending a part of the electric circuit board so as to stand upright for fitting into the notch portion or the through hole of the optical waveguide unit;
    wherein the notch portion or the through hole in the optical waveguide unit is located and formed at a predetermined location with respect to one end surface of the core;
    wherein the bent portion of the electric circuit unit is located and formed at a predetermined location with respect to the optical element; and
    wherein the optical waveguide unit and the electric circuit unit are coupled to each other in a state in which the bent portion of the electric circuit unit fits into the notch portion or the through hole in the optical waveguide unit.

2. The opto-electric hybrid board according to claim 1,
    wherein the notch portion in the optical waveguide unit is formed so as to be V-shaped or Y-shaped, a width of which gradually decreases toward a valley of the notch;
    wherein a notch portion which is V-shaped or Y-shaped, a width of which gradually decreases toward a valley of the notch, is formed in the bent portion of the electric circuit unit; and
    wherein the notch portion which is in the optical waveguide unit and the notch portion in the bent portion of the electric circuit unit fit into each other.

3. A manufacturing method for an opto-electric hybrid board in which an optical waveguide unit and an electric circuit unit having an optical element mounted thereon are coupled, the method comprising:
    manufacturing the optical waveguide unit comprising:
        forming an undercladding layer;
        forming, on a surface of the undercladding layer, a core for an optical path; and
        forming an overcladding layer so as to cover the core, at least one of the forming of the undercladding layer and the forming of the overcladding layer comprising forming a notch portion or a through hole for locating the electric circuit unit at a predetermined location located with respect to one end surface of the core;
    manufacturing the electric circuit unit comprising:
        forming an electric circuit board;
        mounting the optical element at a predetermined portion on the electric circuit board; and
        forming, after the mounting the optical element, a bent portion for fitting into the notch portion or the through hole of the optical waveguide unit by bending so as to stand upright at a predetermined location located with respect to the optical element; and
    coupling the optical waveguide unit and the electric circuit unit to manufacture the opto-electric hybrid board, the coupling comprising fitting the bent portion of the electric circuit unit into the notch portion or the through hole in the optical waveguide unit.

4. The manufacturing method for an opto-electric hybrid board according to claim 3,
    wherein the forming of the notch portion comprises forming the notch portion in the optical waveguide unit so as to be V-shaped or Y-shaped, a width of which gradually decreases toward a valley of the notch;
    wherein the forming of the bent portion comprises forming a notch portion which is V-shaped or Y-shaped, a width of which gradually decreases toward a valley of the notch, in the bent portion of the electric circuit unit; and
wherein the fitting the bent portion comprises causing the notch portion in the optical waveguide unit and the notch portion in the bent portion of the electric circuit unit to fit into each other.

* * * * *